United States Patent [19]
Nagano

[11] Patent Number: 5,386,258
[45] Date of Patent: Jan. 31, 1995

[54] OPTICAL APPARATUS HAVING A VISUAL AXIS DIRECTION DETECTING DEVICE

[75] Inventor: Akihiko Nagano, Kawasaki, Japan

[73] Assignee: Canon Kabushiki Kaisha, Tokyo, Japan

[21] Appl. No.: 264,183

[22] Filed: Jun. 22, 1994

Related U.S. Application Data

[63] Continuation of Ser. No. 148,425, Nov. 8, 1993, abandoned, which is a continuation of Ser. No. 821,622, Jan. 16, 1992, abandoned.

[30] Foreign Application Priority Data

Jan. 17, 1991 [JP] Japan ............................. 3-017092
Jan. 17, 1991 [JP] Japan ............................. 3-017093

[51] Int. Cl.⁶ .................. G03B 3/00; G03B 13/02; G03B 29/00
[52] U.S. Cl. .................. 354/400; 354/62; 354/219; 351/210
[58] Field of Search .......... 354/62, 402, 400, 403, 354/410, 412, 219; 351/210, 211, 212

[56] References Cited

U.S. PATENT DOCUMENTS

| | | | |
|---|---|---|---|
| 3,797,921 | 3/1974 | Kilmer et al. | 354/62 X |
| 5,036,347 | 7/1991 | Tsunekawa et al. | 354/62 X |
| 5,182,443 | 1/1993 | Suda et al. | 250/201.2 |
| 5,214,466 | 5/1993 | Nagano et al. | 354/62 X |
| 5,225,862 | 7/1993 | Nagano et al. | 354/62 |
| 5,231,674 | 7/1993 | Cleveland et al. | 351/210 X |
| 5,245,371 | 9/1993 | Nagano et al. | 354/62 |
| 5,253,008 | 10/1993 | Konishi et al. | 354/402 |
| 5,260,734 | 11/1993 | Shindo | 354/219 |
| 5,280,312 | 1/1994 | Yamada et al. | 351/211 |
| 5,298,297 | 3/1994 | Takei | 428/1 |

FOREIGN PATENT DOCUMENTS 61-172552 8/1986 Japan.
64-241511 9/1989 Japan.
1274736 11/1989 Japan.

Primary Examiner—Howard B. Blankenship
Assistant Examiner—Joe N. Noh
Attorney, Agent, or Firm—Fitzpatrick, Cella, Harper & Scinto

[57] ABSTRACT

An optical apparatus includes a viewer for viewing an object therethrough, a light receiving device for receiving a reflected light beam from an eyeball of an observer looking into the viewer, and a device for obtaining at least one optical constant of the eyeball from the electrical signal of the light receiving device, effecting correction during the calculation of the direction of the visual axis by the use of the optical constant, and producing a signal indicative of the direction of the visual axis.

19 Claims, 9 Drawing Sheets

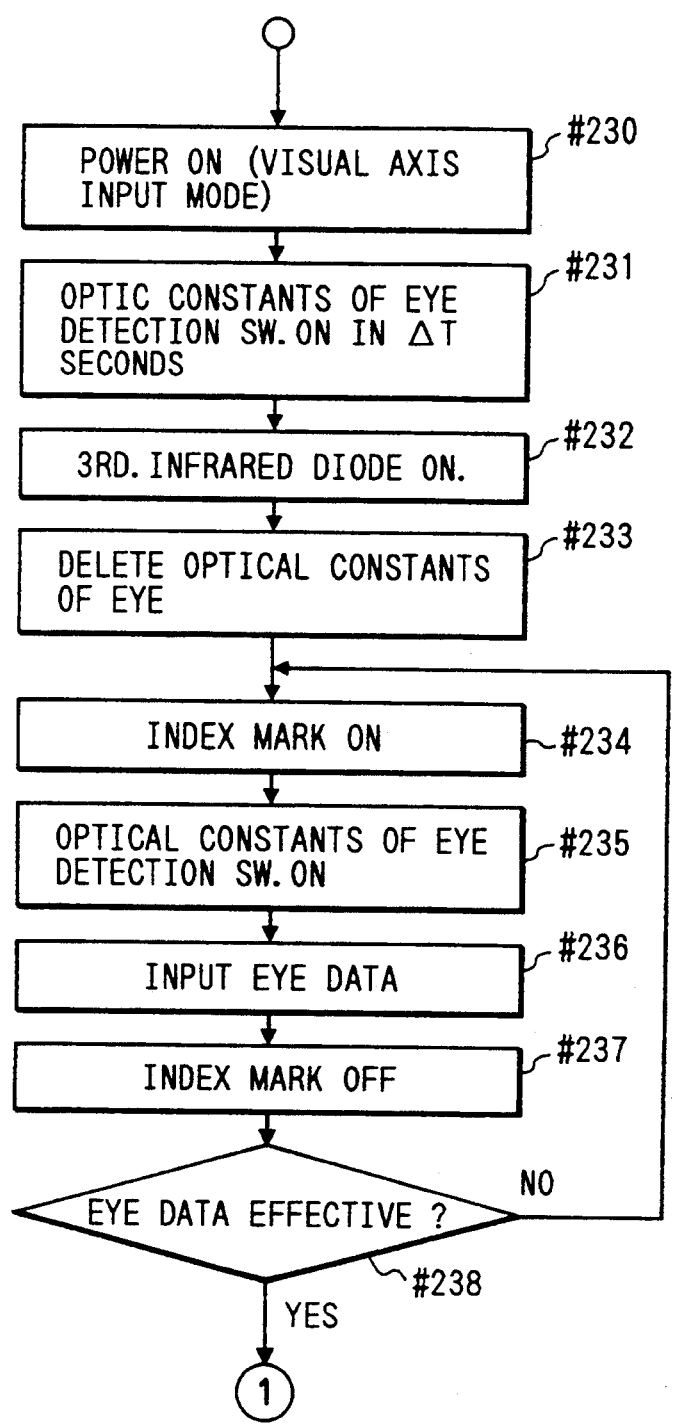

OPTICAL APPARATUS HAVING A VISUAL AXIS DIRECTION DETECTING DEVICE

This application is a continuation of application Ser. No. 08/148,425 filed Nov. 8, 1993, which is a continuation of application Ser. No. 07/821,622 filed Jan. 16, 1992, both now abandoned.

BACKGROUND OF THE INVENTION

1. Field of the Invention

This invention relates to an optical apparatus having a visual axis detecting device, and particularly to an optical apparatus, for example, a camera, having a visual axis detecting device utilizing the reflected image of an eyeball of the observer (photographer) obtained when the eyeball surface is illuminated, to detect the eye gaze point or the axis in the direction of the eye gaze point, the so-called visual axis, which the observer is observing through a finder system on an observation plane (focal plane) on which an object image by an observation system is formed.

2. Related Background Art

There have heretofore been proposed various apparatuses (for example, eye cameras) for detecting which position on an observation plane the observer is observing, i.e., detecting the so-called visual axis.

For example, in Japanese Laid-Open Patent Application No. 61-172552, a parallel light beam from a light source is projected onto the front eye part of an eyeball of the observer and the visual axis is found by the utilization of the imaged positions of the corneal reflection image by the reflected light from the cornea and the pupil. Also, Japanese Laid-Open Patent Application No. 64-241511 by the assignee of this application discloses a device for detecting the direction of the visual axis.

FIGS. 12A and 12B of the accompanying drawings illustrate a conventional visual axis detecting method, FIG. 12A being a schematic view of the essential portions of a visual axis detecting optical system, and FIG. 12B being an illustration of the intensity of an output signal from the photoelectric element array 6 of FIG. 12A.

In FIG. 12A, the reference numeral 5 designates a light source such as a light emitting diode which emits infrared light not sensed by the observer. The light source 5 is disposed on the focal plane of a light projection lens 3.

The infrared light emitted from the light source 5 is collimated by the light projection lens 3, is reflected by a half mirror 2 and illuminates the cornea 21 of an eyeball 201. At this time, the reflected image of the light source (virtual image), via part of the infrared light reflected by the surface of the cornea 21, is transmitted through the half mirror 2, is condensed by a light receiving lens 4 and is re-imaged at a position $Zd'$ on a photoelectric element array 6.

Also, light beams from the end portions a and b of an iris 23 form the images of the end portions a and b at positions $Za'$ and $Zb'$ on the photoelectric element array 6 through the half mirror 2 and the light receiving lens 4. Where the angle of rotation $\theta$, which is the angle formed by the optical axis M of the eyeball with respect to the optical axis L of the light receiving lens 4, is small, when the coordinates of the end portions a and b of the iris 23 are $Za$ and $Zb$, the coordinates $Zc$ of the central position of a pupil 24 are expressed as $$Zc \approx (Za + Zb)/2.$$

Also, the Z coordinates of the corneal reflection image d and the Z coordinates of the center of curvature O of the cornea 21 coincide with each other and therefore, when the Z coordinates of a position d at which the corneal reflection image is created are $Zd$ and the distance from the center of curvature O of the cornea 21 to the center C of the pupil 24 is $L_{OC}$, the angle of rotation $\theta$, which is the angle formed by the optical axis M of the eyeball with respect to the optical axis L substantially, satisfies the following relational expression:

$$L_{OC}*\mathrm{SIN}\theta \approx Zc - Zd \tag{1}$$

Therefore, in calculation means 9, the positions of particular points (the corneal reflection image d and the end portions a and b of the iris) projected onto the surface of the photoelectric element array 6 as shown in FIG. 12B are detected, whereby the angle of rotation $\theta$ of the optical axis M of the eyeball 201 can be found. At this time, expression (1) is rewritten as follows:

$$\beta * L_{OC}*\mathrm{SIN}\theta \approx \frac{Z_{d'} + Z_{b'}}{2} - Z_{d'}, \tag{2}$$

where $\beta$ is a magnification determined by the position of the eyeball relative to the light receiving lens 4, and * indicates multiplication.

Now, it is known that the optical axis M of the eyeball of the observer does not coincide with the visual axis. In Japanese Laid-Open Patent Application No. 64-274736, it is disclosed that the correction of the angle between the optical axis of the eyeball of the observer and the visual axis is effected to thereby detect the visual axis. Therein, the angle of rotation $\theta$ of the optical axis of the eyeball of the observer in the horizontal direction is calculated, and when the corrected value of the angle between the optical axis of the eyeball and the visual axis is $\beta$, the visual axis $\theta H$ of the observer in the horizontal direction is found as $$\theta H = \theta \pm \delta \tag{3}$$

As regards the signs $\pm$, when the angle of rightward rotation with respect to the observer is positive, the sign $+$ is selected if the observer's eye looking into the observation apparatus is the left eye, and the sign $-$ is selected if the eye is the right eye.

Also, in FIG. 12A, there is shown an example in which the eyeball of the observer rotates in the Z-X plane (for example, the horizontal plane), but detection is likewise possible also in the case where the eyeball of the observer rotates in the X-Y plane (for example, the vertical plane).

However, the component of the visual axis of the observer in the vertical direction coincides with the component $\theta'$ of the optical axis of the eyeball in the vertical direction and therefore, the visual axis $\theta V$ in the vertical direction is $$\theta V = \theta' \tag{4}$$

FIG. 13 is a view of the optical system when the visual axis detecting device of FIG. 12 is applied to a portion of the finder system of a single-lens reflex camera.

In FIG. 13, the object light transmitted through a photo-taking lens 101 is reflected by a jump-up mirror 102 and is imaged near the focal plane of a focusing screen 104. Further, the object light diffused by the focusing screen 104 enters the eye point 201a of the photographer through a condenser lens 105, a pentaprism 106 and an eyepiece 1 having a light dividing surface 1a.

The visual axis detecting optical system is comprised of illuminating means comprising a light source 5 such as an infrared light emitting diode not sensed by the photographer (observer) and a light projection lens 3 and having an optical axis N, and light receiving means comprising a photoelectric element array 6, a half mirror 2 and a light receiving lens 4 and having an optical axis L, and is disposed above the eyepiece 1 having the light dividing surface 1a comprising a dichroic mirror. The infrared light emitted from the infrared light emitting diode 5 is reflected on the light dividing surface 1a and illuminates the eyeball 201 of the photographer. Further, part of the infrared light reflected by the eyeball 201 is again reflected by the light dividing surface 1a and is condensed on the photoelectric element array 6 through the light receiving lens 4 and the half mirror 2. The direction of the visual axis of the photographer is calculated in calculation means 9 from the image information of the eyeball (for example, the output signal shown in FIG. 12B) obtained on the photoelectric element array 6. That is, the point on the focusing screen 104 which the observer is observing (the eye gaze point) is found.

From the aforementioned visual axis $\theta H$ in the horizontal direction and the visual axis $\theta V$ in the vertical direction at this time, positions (Zn, Yn) on the focusing screen 104 which the photographer is seeing are found as $$Zn = m^*\theta H \\ Yn = m^*\theta V \Big\}, \quad (5)$$

where m is a constant determined by the finder system of the camera.

If the position on the focusing screen 104 in the single-lens reflex camera the photographer is observing can be known, where for example, in the automatic focus detecting apparatus of the camera, points at which focus detection is possible are provided not only at the center of the image field but also at a plurality of locations in the image field and the photographer attempts to select one of those points and effect automatic focus detection, the trouble of manually selecting and inputting that one point is omitted and the point which the photographer is observing, i.e., the eyegaze point, is regarded as the point for effecting focus detection, and this is effective for automatically selecting the point and effecting automatic focus detection.

Generally, cameras are used by many people of all ages and both sexes, and the size of each portion of the eyeball of a photographer using a camera differs from person to person. So, in eye cameras for visual axis measurement commercially available, differences between individual users are corrected, whereby the error of visual axis detection is corrected.

In the aforedescribed visual axis detecting method, the calculation expression (2) for the angle of rotation $\theta$ of the eyeball includes a parameter $L_{OC}$ related to the size of the eyeball (the distance from the center of curvature O of the angle 21 to the center of the pupil 24). This has led to the problem that if the size of the eyeball of a person who uses a camera, i.e., the parameter $L_{OC}$, deviates greatly from a value corresponding to the preset distance $L_{OC}$, an error occurs between the calculated angle of rotation $\theta$ of the eyeball and the actual angle of rotation of the eyeball and visual axis detection accuracy is reduced.

Further, it has been found that the correction angle $\delta$ of expression (3) between the optical axis of the eyeball and the visual axis also differs depending on a characteristic such as the size of the eyeball of the photographer. This has led to the problem that when the correction angle $\delta$ has been set to a predetermined value, an error occurs between the direction $\theta H$ of the calculated visual axis and the direction of the actual visual axis depending on the photographer and visual axis detection accuracy is reduced.

In the eye cameras for visual axis measurement commercially available, correction of differences between individual users is effected. However, the optical axis of the eyeball of a user and the optical axis of a camera which photographs a scene which the user seems to be seeing do not coincide with each other, and this has led to the disadvantage that an index mark at which the user gaze must be kept considerably far from the eye camera and the index mark cannot be made integral with the eye camera.

Further, to effect the adjustment of the eye camera so that the position of the index mark photographed by the camera and displayed on a television monitor may coincide with the position of the visual axis detected when the user is gazing at the index mark, there is the difficulty that an assistant tester is necessary and the adjustment is cumbersome.

As one of methods of correcting for the individual differences in visual axes, usually index marks are provided at two or more locations in the finder system of a visual axis detecting device (an observation device) and the observer is made to gaze at the index marks. At that time, the coordinates of the eye gaze point detected in the visual axis detecting device are compared with the actual positions of the index marks to thereby obtain an amount of correction. At this time, the correction data of the observer is memorized in the visual axis detecting device, and the calculation of the visual axis is executed on the basis of the correction data.

However, the cornea of the human eyeball is substantially spherical within several millimeters about the point at which the cornea intersects the optical axis of the eyeball, but is of a flattened shape in the other area thereof.

Also, the illuminating light source of the visual axis detecting device is usually disposed so as to illuminate the eyeball obliquely from the sides thereof by two such light sources. Therefore, when an attempt is made to obtain the correction data of the visual axis by the utilization of the corneal reflection image, if respective light beams forming two corneal reflection images comprise light reflected on areas which are not symmetrical with respect to the optical axis of the cornea, the positions of the two corneal reflection images deviate relative to the positions when light is reflected on areas which are symmetrical with respect to the optical axis of the cornea, and in some cases, right correction data has not been obtained.

Likewise, the correction data of the visual axis is also obtained by the use of an iris image in addition to the corneal reflection images, but if respective light beams forming two partial iris images lying at the boundary between the pupil and the iris comprise light transmitted through areas which are not symmetrical with respect to the optical axis of the cornea, the positions of the two partial cornea images deviate relative to the positions when light is transmitted through areas which are symmetrical with respect to the optical axis of the cornea, and this has led to the disadvantage that right correction data is not obtained.

SUMMARY OF THE INVENTION

It is an object of the present invention to provide an optical apparatus having a visual axis detecting device which uses optical constant detecting means for detecting the optical constants of the eyeball of the observer (for example, the radius of curvature and the anterior chamber depth of the eyeball) and visual axis correction calculating means for correcting any detection error of visual axis resulting from an individual difference in the optical constants of the eyeball, thereby being capable of automatically correcting the detection error of visual axis resulting from an individual difference in the size or the like of the eyeball, and accomplishing highly accurate visual axis detection.

It is another object of the present invention to detect, in an optical apparatus having a visual axis detecting device, the visual axis of the observer looking into a finder system by visual axis detecting means, detect the optical constants of the front eye part of the eyeball of the observer by optical constant detecting means by the use of a value obtained by the visual axis detecting means, and correct the visual axis detected by the visual axis detecting means by the use of a value obtained by the optical constant detecting means, by visual axis correction calculating means.

It is still another object of the present invention to provide an optical apparatus having a visual axis detecting device in which a light beam for forming the images of two light sources by a corneal reflection image and the images of the two portions of the edge of an iris is projected onto an eyeball so as to be reflected by and transmitted through areas which are substantially symmetrical with respect to the optical axis of the cornea, whereby correction data for correcting an individual differences in the visual axes resulting from an individual difference in the size or the like of the eyeball is accurately detected to enable highly accurate visual axis detection to be accomplished.

It is yet still another object of the present invention to discriminate, in an optical apparatus having a visual axis detecting device having visual axis detecting means for detecting the visual axis of the eyeball of the observer looking into a finder system, and visual axis correcting means for correcting the visual axis obtained by the visual axis detecting means, by the use of an index mark displayed in the finder system, whether the eyeball of the observer looking into the finder system is the right eye or the left eye by discrimination means, select a predetermined index mark from among a plurality of index marks displayed in said finder system, on the basis of a signal from the discrimination means, and display the selected index mark.

BRIEF DESCRIPTION OF THE DRAWINGS

FIG. 10 is a flowchart of the detection of the optical constants of the eyeball in the second embodiment.

DESCRIPTION OF THE PREFERRED EMBODIMENTS

Figure 1A:
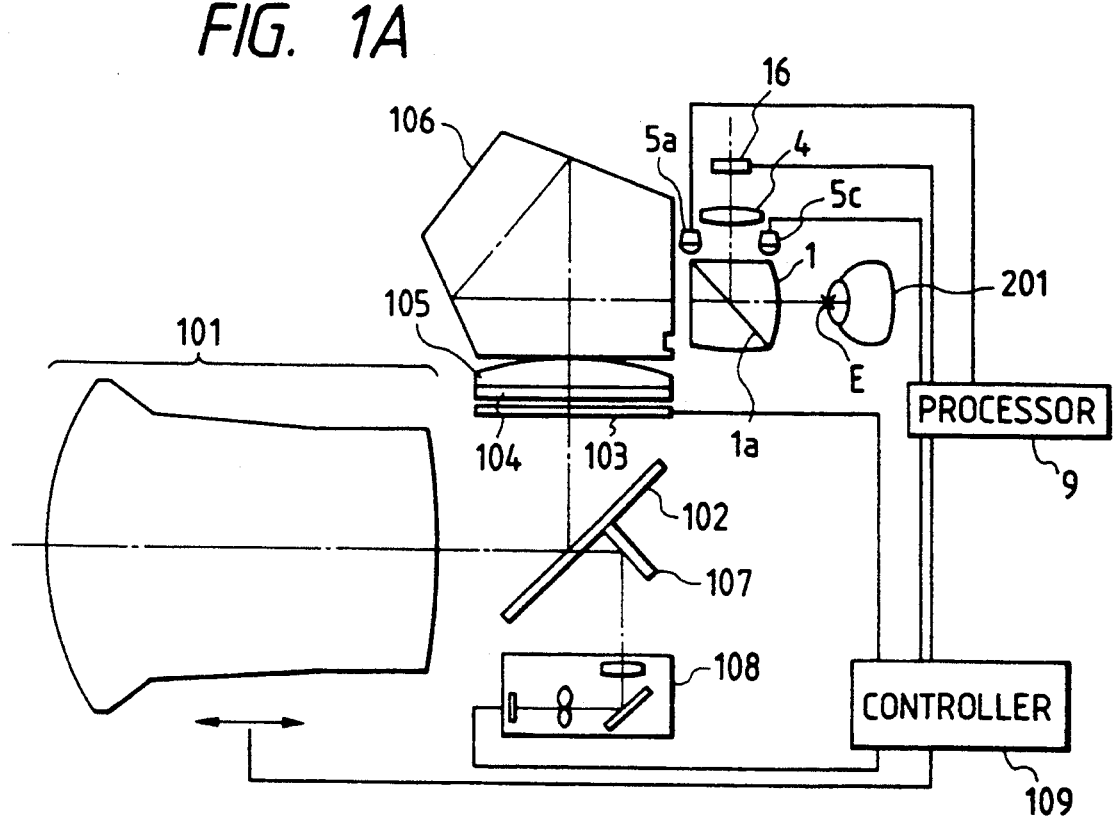
FIG. 1A is a schematic view of the essential portions of a first embodiment when the present invention is applied to a single-lens reflex camera.
Figure 1B:
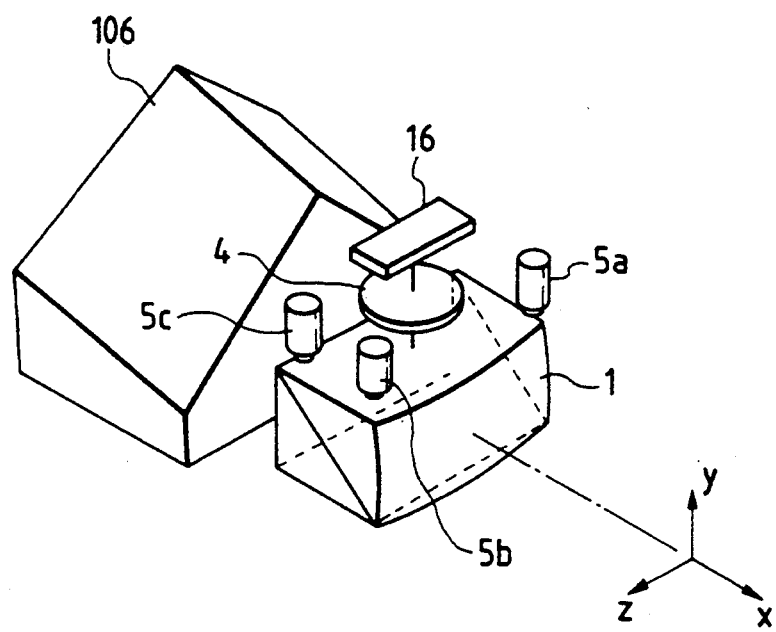
FIG. 1B is a perspective view of some essential portions of FIG. 1A.
Figure 2:
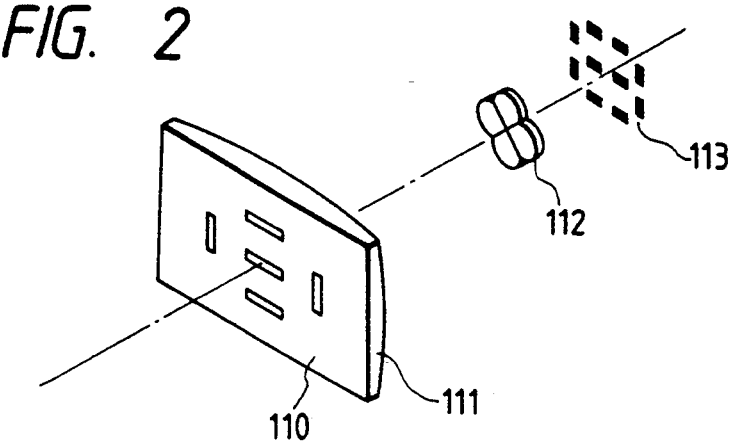
FIG. 2 is a perspective view of some essential portions of a focus detecting apparatus.
Figure 3A:
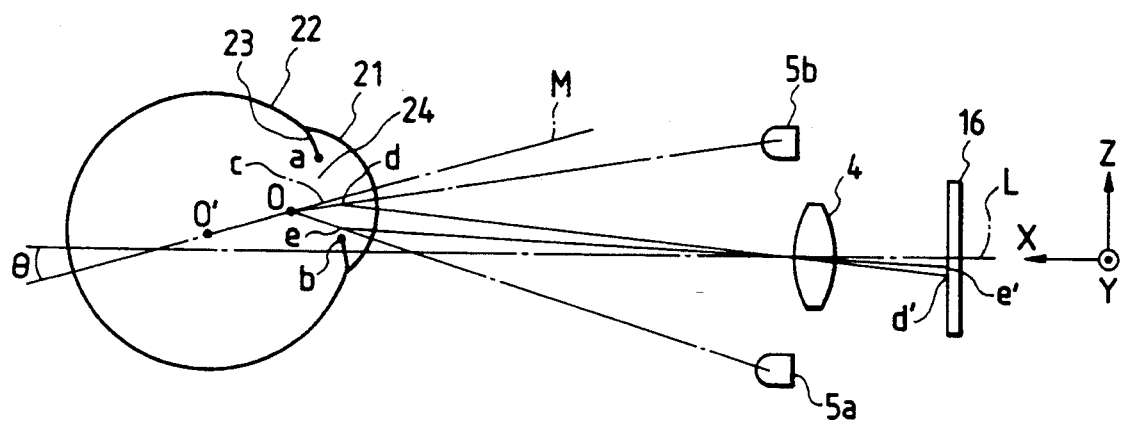
FIG. 3A illustrates the principle of visual axis detection.
Figure 3B:
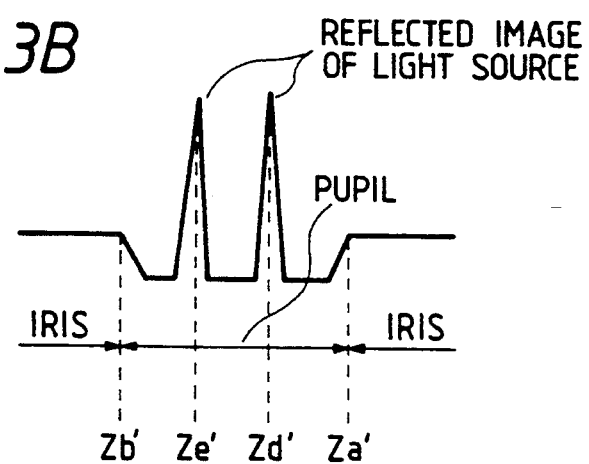
FIG. 3B is an illustration of the output intensity of the image sensor of FIG. 3A.

FIG. 1A shows the optical system of a first embodiment when the present invention is applied to a single-lens reflex camera, and FIG. 1B depicts a perspective view thereof. FIG. 2 is a perspective view of an automatic focus detecting apparatus, FIG. 3A shows an optical cross-section for illustrating a visual axis detecting method in the present invention, and FIG. 3B shows the output intensity from an image sensor.

In FIG. 1, the reference numeral 1 designates an eyepiece in which there is obliquely disposed a dichroic mirror 1a transmitting visible light therethrough and reflecting infrared light. The dichroic mirror 1a serves also as an optical path divider. The reference numeral 4 denotes a light receiving lens, and the reference characters 5a, 5b and 5c designate illuminating means, each of which comprises, for example, a light emitting diode emitting infrared light not sensed by the observer. The reference numeral 16 denotes an image sensor. The light receiving lens 4 and the image sensor 16 each constitute one element of light receiving means. A light source may be the tip end of optical fiber disposed in opposed relationship with a lamp.

The image sensor 16 comprises a photoelectric element array arranged two-dimensionally, and is disposed so as to be conjugate with the vicinity of the pupil of an eye which is at a predetermined position (the position of the general eye point of a photographer who does not use glasses) with respect to the light receiving lens 4 and the eyepiece 1.

The reference numeral 9 designates a visual axis calculation processing device having, besides the function of calculating the optical constants of an eyeball and the function of correcting and calculating the visual axis, the function of controlling the infrared light emitting diodes 5a, 5b and 5c. The elements 1, 4, 5 and 16 together constitute an eyeball visual axis detecting means.

The reference numeral 101 denotes a fixedly provided or removably mounted photo-taking lens, the reference numeral 102 designates a quick return (QR) mirror, the reference numeral 103 denotes an indicating element, the reference numeral 104 designates a focusing screen, the reference numeral 105 denotes a condenser lens, the reference numeral 106 designates a pentaprism, and the reference numeral 107 denotes a sub-mirror. The reference numeral 108 designates a multipoint focus detecting device which selects a plurality of areas in the photographing image field and effects focus detection. A description of the multipoint focus detecting device is not necessary for an understanding of the present invention.

In the present embodiment, as shown in FIG. 2, a field mask 110 disposed near the predetermined imaging plane of the photo-taking lens 101 and having a plurality of slits for determining distance measuring areas, respectively, and a lens member 111 serving as a field lens for the image in each slit are disposed in proximity to each other, and further, a set 112 of re-imaging lenses corresponding in number to the slits and a set 113 of photoelectric element arrays are disposed in succession. The field mask 110, the field lens 111, the set 112 of re-imaging lenses and the set 113 of photoelectric element arrays together constitute a well-known focus detecting system. The reference numeral 109 denotes a camera control device having the function of driving an indicating element in a finder, the function of detecting and calculating the focus and the function of driving the lens.

In the present embodiment, part of the object light transmitted through the photo-taking lens 101 is reflected by the QR mirror 102 and forms an object image near the focusing screen 104. The object light diffused by the diffusing surface of the focusing screen 104 is directed to an eye point E through the condenser lens 105, the pentaprism 106 and the eyepiece 1. The optical axis of the eyepiece 1 coincides with the X-axis.

Figure 5:
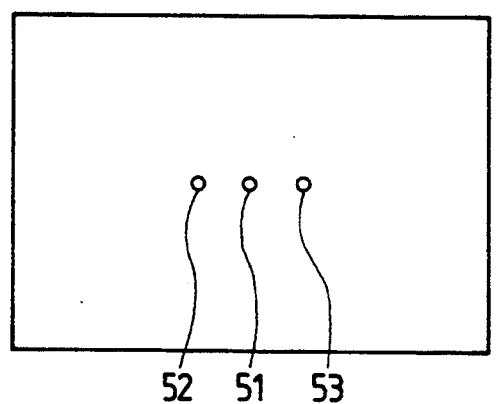
FIG. 5 is a view of the finder view field.

The indicating element 103 is, for example, a two-layer guest-host type liquid crystal element which does not use a polarizing plate, and serves also as indicating means in the finder which is one element of eyeball optical constant detecting means and as shown in FIG. 5, it indicates index marks 51, 52 and 53 for the detection of the optical constants (corneal radius r and anterior chamber depth t) of the front eye part in the finder field. The anterior chamber depth can be regarded as being equal to the distance from the cornea to the pupil.

Also, part of the object light transmitted through the photo-taking lens 101 is transmitted through the QR mirror 102, is reflected by the sub-mirror 107 and is directed to the aforementioned multipoint focus detecting device 108 disposed at the bottom of the camera body. Further, on the basis of the focus detection information of the position on the object surface selected by the multipoint focus detecting device 108 on the basis of a signal from the camera control device 109, the outward axial movement (or the inward axial movement) of the photo-taking lens 101 is effected by a photo-taking lens driving device (not shown), whereby focus adjustment is effected.

The visual axis detecting device according to the present embodiment is comprised of visual axis detecting means comprising members designated by the reference numerals 1, 4, 5 and 16, and a visual axis calculation processing device 9 for calculating the optical constants of an eyeball from the image of the eyeball and effecting the correction and calculation of the visual axis. The visual axis calculation processing device 9 includes optical constant calculating means which is a constituent of the eyeball optical constant detecting means, eyeball optical constant memory means and visual axis correction calculation means.

The design of the present invention is made such that during the calculation of the optical constants of the eyeball, the discriminating function (discriminating means) of discriminating whether the eye of the photographer looking into the finder system of the camera is the right eye or the left eye and the selecting function (selecting means) of selecting an index mark by the eye of the photographer looking into the finder system of the camera are performed.

The infrared light emitting diodes 5a and 5b of FIG. 1B are disposed symmetrically with respect to the X-Y plane as viewed in the figure. The infrared light emitting diodes 5b and 5c are disposed optically symmetrically with respect to Z-X plane as viewed in the figure. Also, the spacing between the infrared light emitting diodes 5a and 5b and the spacing between the infrared light emitting diodes 5b and 5c are so set as to differ from each other.

In the visual axis detecting means, the infrared light emitted from the infrared light emitting diodes 5a, 5b and 5c enters the eyepiece 1 and is partly reflected by the dichroic mirror 1a, and illuminates the eyeball 201 of the observer located near the eye point E. Also, the infrared light reflected by the eyeball 201 is reflected by the dichroic mirror 1a and forms an image on the image sensor 16 while being converged by the light receiving lens 4. From these data of the eyeball image, the visual axis of the observer is calculated.

The visual axis detecting method will now be described with reference to FIGS. 3A and 3B.

In these figures, the reference characters 5a and 5b designate light sources such as light emitting diodes emitting infrared light not sensed by the observer. The light sources are disposed substantially symmetrically in the Z direction with respect to the optical axis L, and divergingly illuminate the eyeball of the observer. The infrared light emitted from the light source 5b is partly reflected by the surface of the cornea 21. The position, in the direction of the X-axis, of the reflected light source image (virtual image) d formed by the infrared light reflected by the cornea 21 depends on the radius of curvature r of the cornea, and when the distance in the direction of the X-axis between the infrared light emitting diode 5b and the cornea 21 is S, the distance Xd of the virtual image d from the surface of the cornea 21 satisfies the following relational expression:

$$1/Xd + 1/s = 2/r \qquad (6)$$

Part of the infrared light reflected by the surface of the cornea 21 is condensed by the light receiving lens 4 and is re-imaged at a position d' on the image sensor 16. At this time, the imaging magnification $\beta 1$ of the reflected image d by the cornea onto the image sensor 16 is represented by a function of the distance Xt from the reference position of the visual axis detecting optical system (for example, the exit surface of the eyepiece 1 in FIG. 1B) to the cornea 21 of the eyeball of the observer and the radius of curvature r of the cornea 21.

Likewise, the infrared light emitted from the light source 5a is partly reflected by the surface of the cornea 21. Accordingly, the cornea is regarded as a convex mirror. The position, in the direction of the X-axis, of the reflected light source image (virtual image) e formed by the infrared light reflected by the cornea 21 depends on the radius of curvature r of the cornea 21, and the distance Xe of the virtual image e from the surface of the cornea 21 is substantially the same as the distance Xd. Part of the infrared light reflected by the surface of the cornea 21 is condensed by the light receiving lens 4 and is re-imaged at a position e' on the image sensor 16. At this time, the imaging magnification $\beta 1$ of the reflected image e by the cornea onto the image sensor 16 is represented by a function of the distance Xt and the radius of curvature r of the cornea 21.

Generally, the Z coordinates of the midpoint of the reflected light source images d and e do not coincide with the Z coordinates Zo of the center of curvature O of the cornea 21 and therefore, it is desirable to correct this by $\delta_z(Xt, r)$.

Also, light beams from the end portions a and b of an iris 23 form the images of these end portions a and b at positions a' and b' on the image sensor 16 through the light receiving lens 4. Where the angle of rotation $\theta$ of the optical axis M of the eyeball with respect to the optical axis of the light receiving lens 4 (the optical axis L) is small, when the Z coordinates of the end portions a and b of the iris 23 are Za, Zb, the coordinates Zc of the center position C of a pupil 24 are expressed as $$Zc \approx (Za+Zb)/2.$$

At this time, the distance Xc, in the direction of the X-axis, of the center position c of the pupil 24 from the surface of the cornea 21 is substantially equal to the anterior chamber depth t, and the imaging magnification B2 of the center position c of the pupil 24 onto the image sensor 16 is represented by a function of the distance Xt and the anterior chamber depth t.

Also, when the Z coordinates of the positions d and e at which the reflected light source images are created are Zd and Ze, respectively, and the distance between the center of curvature O of the cornea 21 and the center C of the pupil 24 is $L_{OC}(\approx r-t)$, from expression (1), the angle of rotation $\theta$ of the optical axis M of the eyeball substantially satisfies the following relational expression:

$$L_{OC}*\sin\theta \approx Zc-((Zd+Ze)/2+\Delta Z(Xt,\ r)) \qquad (7)$$

Therefore, in the visual axis calculation processing device 9, the positions of respective particular points (the reflected light source images d, e and the end portions a and b of the iris) projected onto portions of the image sensor 16 as shown in FIG. 3B are detected to thereby find the angle of rotation $\theta$ of the optical axis M of the eyeball. At this time, expression (7) is rewritten as $$(r-t)*\sin\theta\Delta((Za'+Zb')/2)\beta 2(Xt,t)-\{(Zd'+Ze')/2+\Delta Z)\}/\beta 1(Xt,r) \qquad (8)$$

Further, the angle of rotation $\theta$ of the eyeball is rewritten as $$\theta \approx \arc\sin\{(Zc'/\beta 2(Xt,\ t)-(Zg'+\Delta Z(Xt,\ r))/\mu 1(Xt,\ r))/(r-t)\}, \qquad (9)$$

where $$Zc' \approx (Za'+Zb')/2$$

$$Zg' \approx (Zd'+Ze')/2.$$

Now, the optical axis and visual axis of the eyeball of the photographer do not coincide with each other. Therefore, the angle of rotation $\theta$ of the optical axis of the eyeball of the photographer in the horizontal direction is calculated and the angle is corrected by the amount of angle correction of the optical axis and visual axis of the eyeball, thereby finding the visual axis $\theta H$ of the photographer in the horizontal direction. The visual axis $\theta H$ of the photographer in the horizontal direction is $$\theta H = \theta - \delta \qquad (10)$$

The absolute value of the correction angle $\delta$ of the optical axis of the eyeball and the visual axis differs from person to person.

Further, the position Zn on the focusing screen 104 the photographer is viewing is found by $$Zn \approx m*\theta H, \qquad (11)$$

where m is a constant determined by the finder system of the camera.

If as described above, the values of the corneal radius r and the anterior chamber depth t of the eyeball of the photographer and the correction angle $\delta$ of the optical axis and visual axis of the eyeball are found in advance and on the basis of the correction calculation expression of the visual axis including the individual difference in the eyeball optical system, the visual axis of the photographer and the eye gaze point on the focusing screen 104 are found by the software of the microcomputer of the visual axis calculation processing device 9, accuracy will be improved.

In the visual axis detecting device according to the present invention, the optical constants of the eyeball optical system of the photographer by the optical constant detecting means are found in the following manner.

Figure 4:
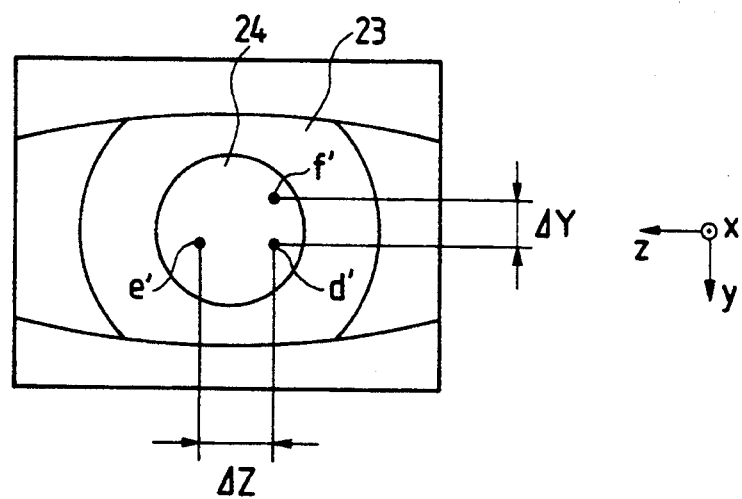
FIG. 4 is an illustration of an eyeball image on the image sensor.

FIG. 4 shows the image of the front eye part on the surface of the image sensor 16, and the infrared light emitting diodes 5a, 5b and 5c in FIG. 1B are turned on and three reflected light source images d', e' and f' by the cornea as shown in FIG. 4 are formed on the image sensor 16.

As described above, the infrared light emitting diodes 5a and 5b are disposed symmetrically with respect to the X-Y plane as viewed in FIG. 1B, and the infrared light emitting diodes 5b and 5c are disposed symmetrically with respect to the Z-X plane as viewed in FIG. 1B, and the spacing between the infrared light emitting diodes 5a and 5b and the spacing between the infrared light emitting diodes 5b and 5c are so set as to differ from each other. Therefore, the spacing $\Delta Z$ between the reflected light source images d' and e' formed and the spacing $\Delta Y$ between the reflected light source images d' and f' also differ from each other. The spacings ΔZ and ΔY between the reflected light source images are a function of the distance Xt from the reference position of the visual axis detecting optical system (for example, the exit surface of the eyepiece 1 in FIG. 1B) to the cornea 21 of the eyeball of the observer and therefore, the distance Xt and the corneal radius r are expressed as:

$$Xt = a1(r) * \Delta Z^{**}2 + a2(r) * \Delta Z + a3(r) \quad (12)$$

$$r = b1(Xt) * \Delta Y^{**}2 + b2(Xt) * \Delta Y + b3(xt), \quad (13)$$

where $\Delta Z^{**}Z$ means $(\Delta Z)^2$, and $\Delta Y$ is similar to this.

The coefficients a1(r), a2(r), a3(r), b1(Xt), b2(Xt) and b3(Xt) are values determined by the construction of the visual axis detecting optical system. The spacings ΔZ and ΔY between the reflected light source images are detected, and the distance Xt and the corneal radius r are calculated on the basis of the aforementioned equations (12) and (13).

Here, the anterior chamber depth t of the eyeball of the photographer is detected by having the photographer gaze at an index mark in the finder system.

When the photographer gazes at an index mark n (the Z coordinates Zn on the focusing screen 104) in the finder system of the camera shown in FIG. 5, expression (11) is rewritten as $$(r-t)*\sin(Zn/m-\theta) \approx Zc'/\beta 2(Xt, t) - (Zg' + \Delta z(Xt, r))/\beta 1(Xt, r) \ldots \quad (14)$$

In the case of a photographer whose eye looking into the finder system is the right eye, when index marks, e.g. an index mark 51 (the Z coordinates Z1 on the focusing screen 104) and an index mark 52 (the Z coordinates Z2 on the focusing screen 104), disposed so that a light beam forming two reflected light source images may be reflected on areas substantially symmetrical with respect to the optical axis of the eyeball of the photographer and so that the angle of rotation of the optical axis M of the eyeball of the photographer may be small relative to the optical axis of the visual axis detecting means are designated, expression (14) is expressed as:

$$(r-t)*(Z1/m-\theta) \approx Zc1'/\beta 2(Xt1, t) - (Zg1' + \Delta z(Xt1, r))/\beta 1(Xt1, r) \ldots \quad (15)$$

$$(r-t)*(Z2/m-\delta) \approx Zc2'/\beta 2(Xt2, t) - (Zg2' + \Delta z(Xt2, r))/\beta 1(Xt2, r) \ldots \quad (16)$$

The correction angle δ of the optical axis and visual axis of the eyeball is detected from expressions (15) and (16), whereafter the coordinates of the particular points of the eyeball image detected when the respective index marks are gazed at are substituted for these expressions, whereby the anterior chamber depth t can be calculated. If the anterior chamber depth t is thus found, the correction angle δ of the optical axis and visual axis of the eyeball can be calculated therefrom.

Figure 6:
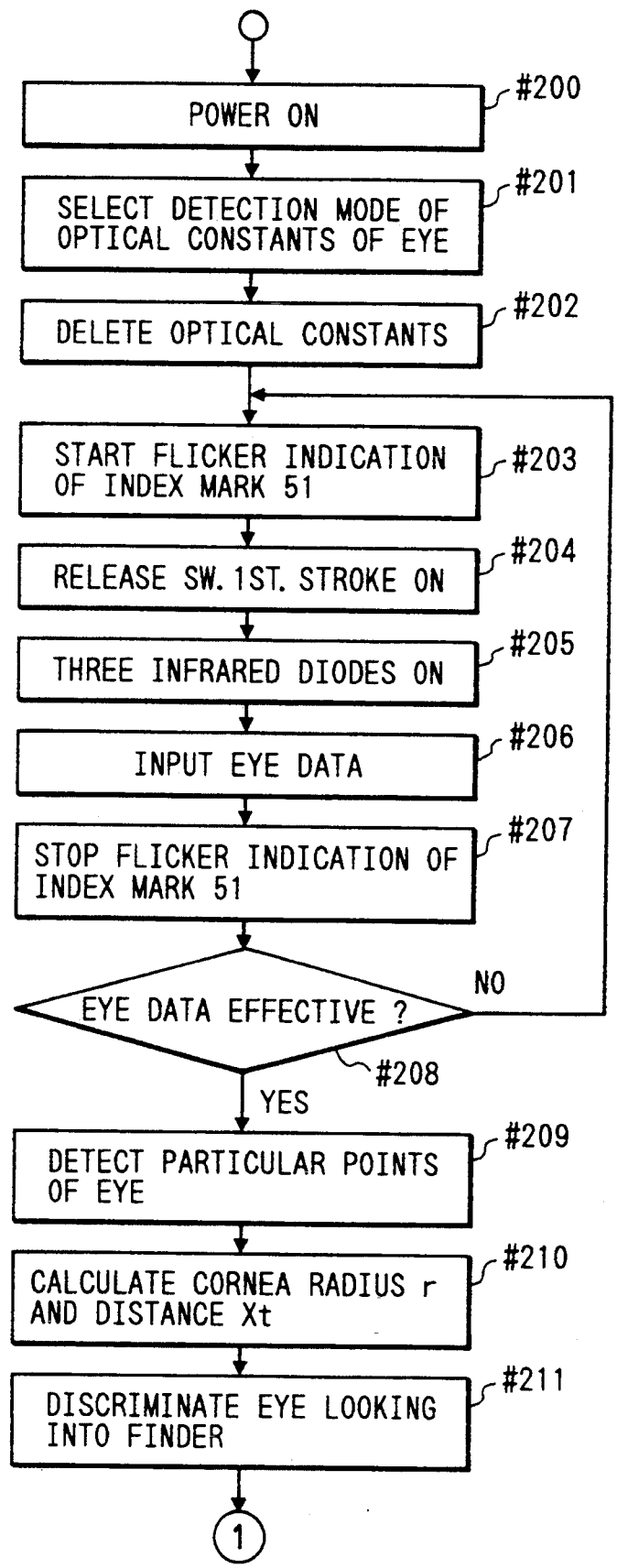
FIG. 6 is a flowchart of the detection of the optical constants of the eyeball.
Figure 7:
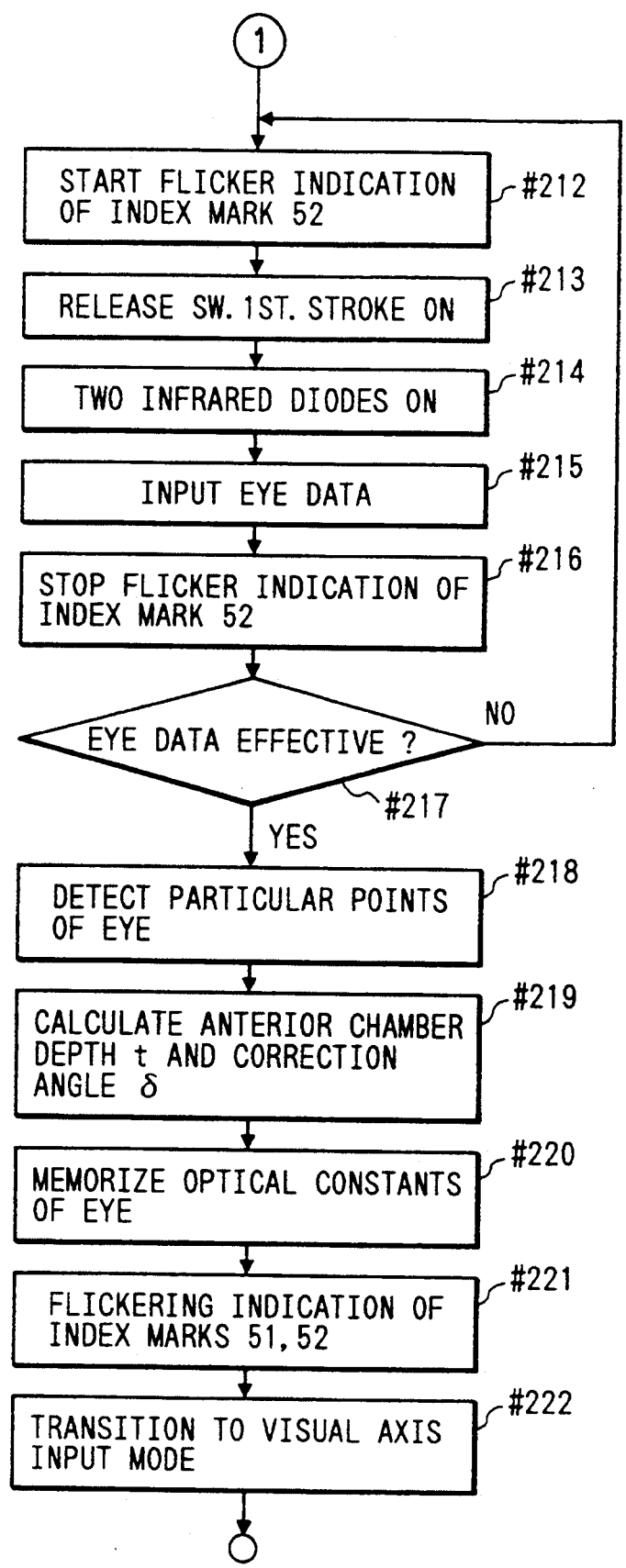
FIG. 7 is a flowchart of the detection of the optical constants of the eyeball.
Figure 8:
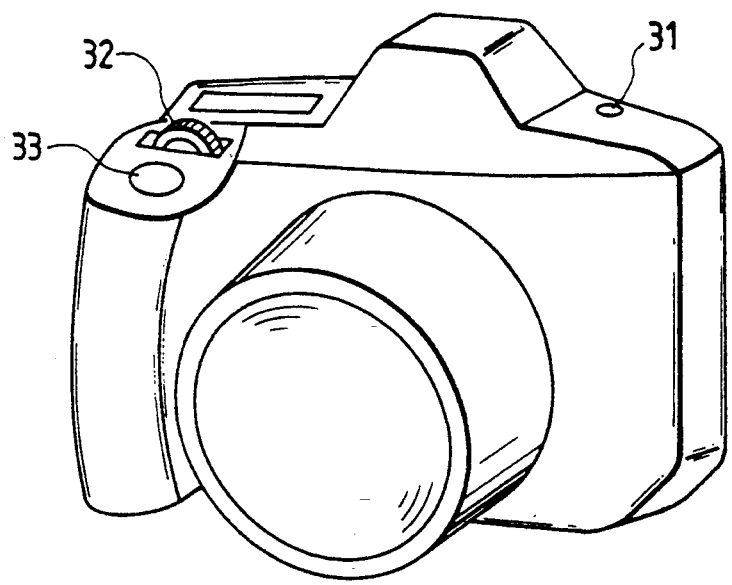
FIG. 8 is a pictorial view of the front portion of the single-lens reflex camera of the first embodiment.

FIGS. 6 and 7 are flow charts of the detection of the optical constants of the eyeball which are visual axis correction data, and FIG. 8 is a pictorial view of a single-lens reflex camera as it is seen from the front thereof. In FIG. 8, the reference numeral 31 designates a mode selection button, and the reference numeral 32 denotes an electronic dial which serves also as an optical constant detection executing switch. The reference numeral 33 designates a release switch. A method of detecting the optical constants of the eyeball will be explained with reference to FIGS. 6, 7 and 8.

The power source switch (not shown) of the camera is closed (#200), whereafter when the photographer selects the eyeball optical constant detection mode by means of the electronic dial 32 (#201) while depressing the mode selection button 31 (FIG. 8), the optical constants of the eyeball memorized in the visual axis calculation processing device 9 are deleted (#202) and the detection of the optical constants of the eyeball of the photographer is newly started.

Also, the index mark 51 disposed at the center (on the optical axis) in the finder system Shown in. FIG. 5 starts flickering due to the signal from the camera control device 109 (#203). When the photographer recognizes that the index mark for detecting the optical constants of the eyeball is flickering, the photographer lightly depresses the release switch 33 to operate the first stroke while gazing at that index mark 51 (#204). On the basis of the starting signal of the release switch 33, the visual axis calculation processing device 9 turns on the infrared light emitting diodes 5a, 5b and 5c for visual axis detection, and these infrared light emitting diodes illuminate the eyeball of the photographer (#205).

Then the eyeball image data is input to the visual axis calculation processing device 9 (#206), and whether the eyeball image data is effective is determined in the visual axis calculation processing device 9 (#208). At the point in time at which the eyeball image data has been input to the visual axis calculation processing device 9, the flicker indication of the index mark 51 in the finder system is terminated (#207), and at the same time, the infrared light emitting diodes 5a, 5b and 5c are turned off.

Now, in the camera of the present embodiment, it is supposed that by the first stroke of the release switch 33 being operated, the automatic focus adjusting and light metering functions of the photo-taking lens are usually performed, but alternatively, the design may be made such that these functions are not performed when the camera is set to the eyeball's optical functions detection mode. If in the visual axis calculation processing device 9, it is determined that the reflected image of the cornea or the image of the iris cannot be detected from the eyeball image data, the flicker indication of the index mark 51 in the finder system is again started (#203) and the same process is repeated.

When the particular points of the reflected image of the cornea and the image of the iris are detected from the eyeball image data (#209), the corneal radius r of the eyeball of the photographer and the distance Xt from the reference position of the visual axis detecting optical system to the cornea 21 of the eyeball of the observer are calculated in the visual axis calculation processing device 9 on the basis of the aforementioned expressions (12) and (13) (#210).

Also, in the visual axis calculation processing device 9, whether the photographer is looking into the finder system by his right eye or by his left eye can be determined from whether θ found from the aforementioned expression (9) is a positive value or a negative value. At this time, a standard value is tentatively substituted for the anterior chamber depth t.

Further, when which of the photographer's eyes is looking into the finder system becomes clear in the visual axis calculation processing device 9, such an index mark, that light beams forming two reflected images of the cornea are reflected on areas symmetrical with respect to the optical axis of the cornea of the eyeball of the photographer and light beams forming two images of the iris lying at the boundary between the pupil and the iris are transmitted through the areas symmetrical with respect to the optical axis of the cornea of the eyeball of the photographer, is selected from among the remaining two index marks.

Assuming that the photographer's eye looking into the finder is the right eye, the left index mark 52 in the finder system shown in FIG. 5 is selected and this index mark 52 starts to flicker in response to a signal from the camera control device 109 (#212, FIG. 7). The photographer recognizes that the index mark for detecting the optical constants of the eyeball is indicating in the finder field, and operates the first stroke of the release switch 33 while gazing at that index mark 52 (#213). On the basis of the signal of the release switch 33, the visual axis calculation processing devide 9 turns on the infrared light emitting diodes 5a and 5b for visual axis detection, and the infrared light emitting diodes illuminate the eyeball of the photographer (#214).

Then, the eyeball image data is input to the visual axis calculation processing device 9 (#215) and whether the eyeball image data is effective is determined in the visual axis calculation processing device 9.

Also, at the point in time at which the eyeball image data has been input to the visual axis calculation processing device 9, the flicker indication of the index mark 52 in the finder system is terminated (#216) and at the same time, the infrared light emitting diodes 5a and 5b are turned off. When it is determined in the visual axis calculation processing device 9 that the reflected image of the cornea or the image of the iris cannot be detected from the aforementioned eyeball image data, the flicker indication of the index mark 52 in the finder system is again started (#212).

When the particular points of the reflected image of the cornea and the image of the iris are detected from the eyeball image data (#218), the anterior chamber depth t and the correction angle δ of the optical axis and visual axis of the eyeball are calculated from the aforementioned expressions (15) and (16) in the visual axis calculation processing device 9.

The thus calculated optical constants of the eyeball are memorized in the visual axis correction data memory means of the visual axis calculation processing device 9 (#220). If the design of the device is such that at this time, the data of the photographer the optical constants of whose eyeball have been detected is also memorized in the visual axis calculation processing device 9, if the detection of the optical constants of the eyeball is once effected for the camera used, no more detection need be effected thereafter.

When the optical constants of the eyeball are memorized in the visual axis calculation processing device 9, the index mark 51 and index mark 52 in the finder flicker for a predetermined time to inform the photographer that the detection of the optical constants of the eyeball has been terminated (#221), whereafter shift is made to the visual axis input mode (#222). In the visual axis input mode, the visual axis of the photographer is accurately detected by the use of the previously calculated optical constants of the eyeball, and it becomes possible to input information intended by the photographer, for example, the position of an object the photographer wants to photograph by focusing, to the camera on the basis of the visual axis of the photographer.

The present embodiment has been discussed with respect to an example in which the eyeball optical constant detection mode is selected after the closing of the power source switch, but alternatively, in the case of a photographer the optical constants of whose eyeballs have already been registered in the camera, shift may immediately be made to the visual axis input mode without the detection of the optical constants of the eyeball being effected.

When it is determined that the photographer's eye looking into the finder is the left eye, the right index mark 53 in the finder system shown in FIG. 5 is selected, and the index mark 53 starts to flicker in response to a signal from the camera control device 109. The operation thereafter is similar to that when the index mark 52 is made to flicker.

Figure 9A:
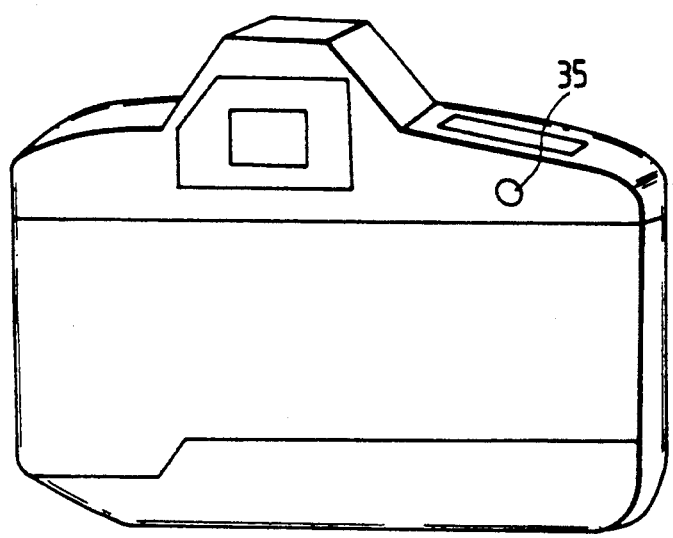
FIG. 9A is a pictorial view of the rear portion of the single-lens reflex camera of a second embodiment.
Figure 9B:
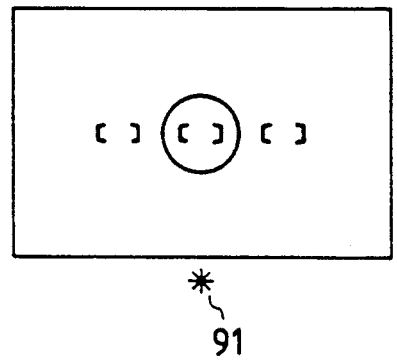
FIG. 9B is a view of the view field in the finder of the second embodiment.
Figure 11:
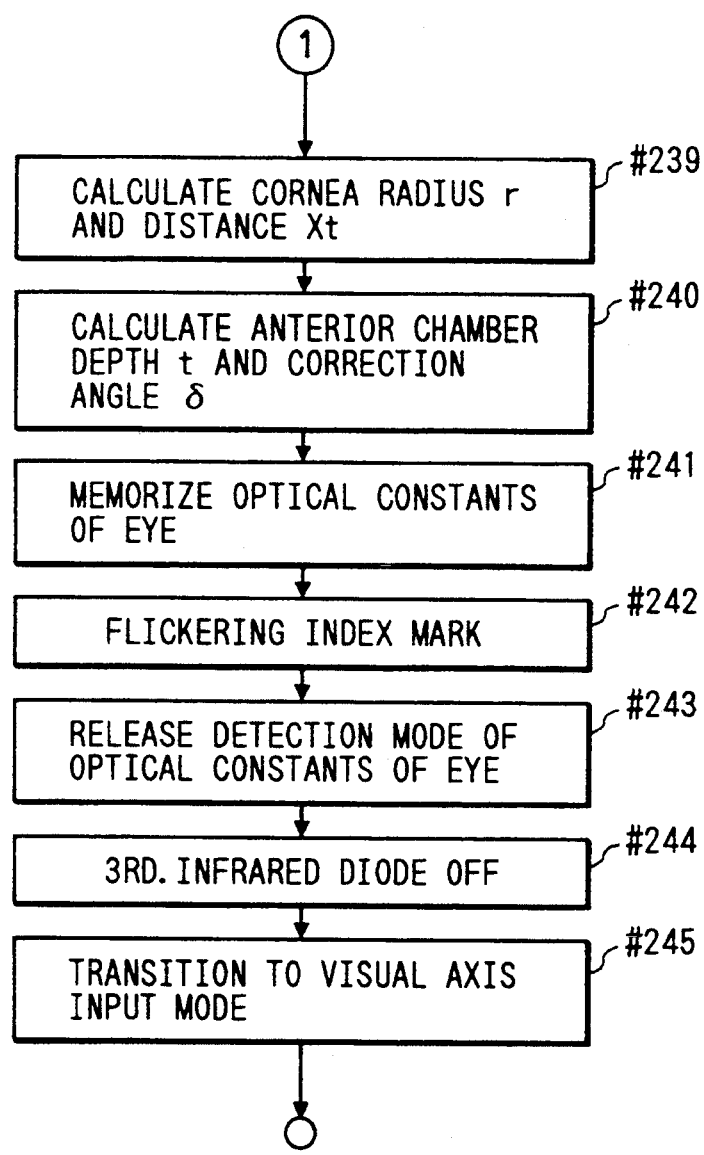
FIG. 11 is a flowchart of the detection of the optical constants of the eyeball in the second embodiment.
Figure 12A:
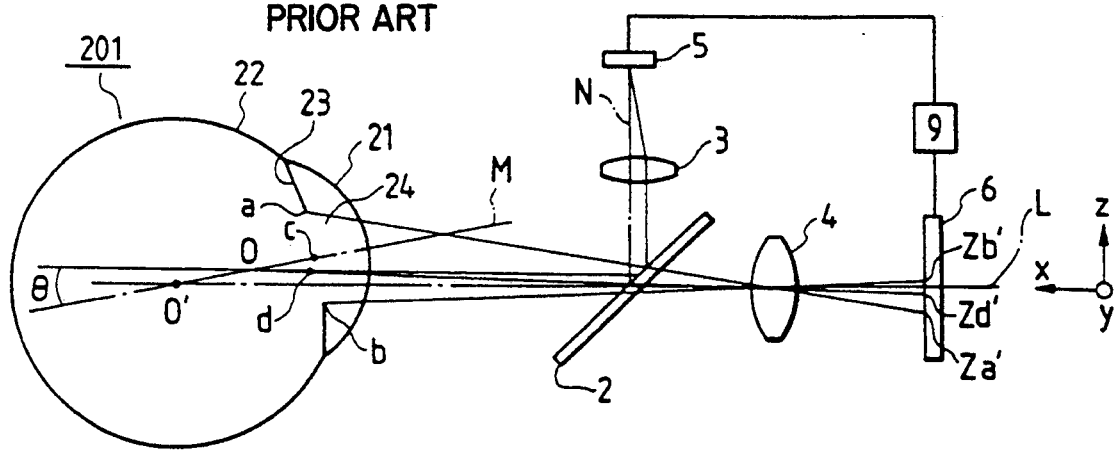
FIG. 12A is a view of a visual axis detecting optical system according to the prior art.
Figure 12B:
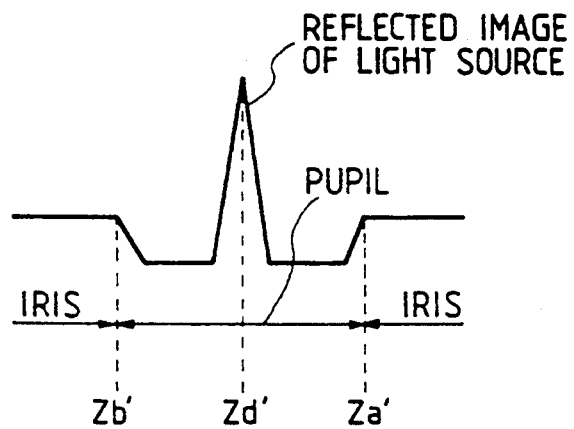
FIG. 12B shows the output intensity of a photoelectric element array.
Figure 13:
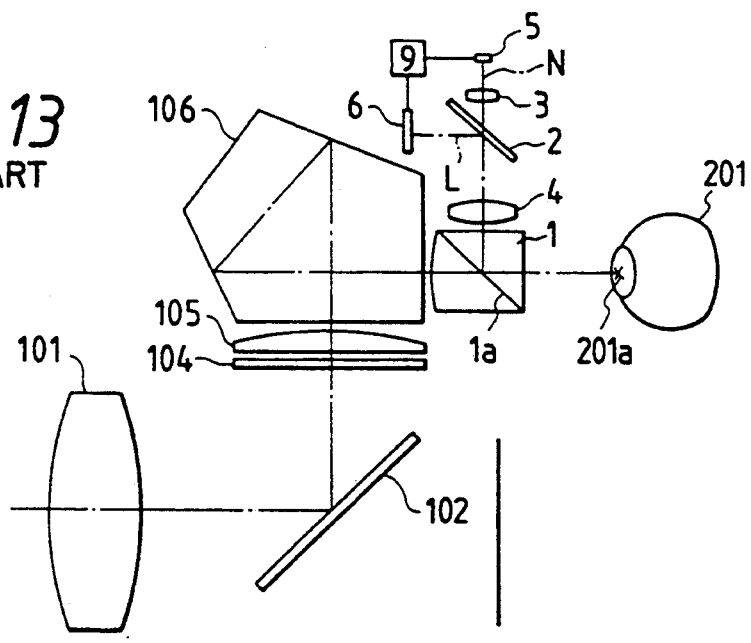
FIG. 13 shows the optical arrangement of a single-lens reflex camera according to the prior art.

FIG. 9A is a pictorial view of the rear portion of a camera for a second embodiment of the present invention, FIG. 9B is a view of the field of view in a finder in the second embodiment, and FIGS. 10 and 11 are flow charts of the second embodiment.

The visual axis detecting device of the present embodiment is similar to that of FIG. 2. In FIG. 9A, the reference numeral 35 designates an eyeball optical constant detecting switch which serves also as an optical constant detection executing switch.

In the present embodiment, what is shown in FIG. 9B is indicating means in the finder in which is disposed an index mark 91 for the detection of the optical constants of an eyeball comprised of a liquid crystal element or a light emitting diode having a back light annexed to the outside of the finder field, and the indication and non-indication of which is controlled by a camera control device (not shown).

A method of detecting the optical constants of an eyeball in the present embodiment will hereinafter be described with reference to the flow charts of the eyeball optical constant detection shown in FIGS. 10 and 11. The optical arrangement used in the present embodiment is the same as that shown in FIGS. 1A and 1B.

When the photographer closes the power source switch (not shown) of the camera and sets the camera to the visual axis input mode (#230), the infrared light emitting diodes 5a and 5b for visual axis detection are turned on on the basis of a signal from the visual axis calculation processing device 9 and start to illuminate the eyeball of the photographer. Further, when the photographer depresses the eyeball optical constant detecting switch 35 for a predetermined time, a shift is made to the eyeball optical constant detection mode (#231). At this time, the infrared light emitting diode 5c for detecting the corneal radius r of the eyeball of the photographer is turned on to generate a third reflected image by the cornea (#232). At the same time, if the optical constants of the eyeball are registered in the visual axis calculation processing device 9 which is eyeball optical constant memory means, the optical constants of that eyeball are detected (#233).

The index mark for the detection of the optical constants of the eyeball located under the middle of the horizontal direction outside the finder field is then turned on on the basis of a signal from the camera control device (#234). The photographer depresses the eyeball optical constant detecting switch 35 (#235) while gazing at the index mark, and inputs the then eyeball image data of the photographer to the visual axis calculation processing device 9 (#236). At the point in time at which the eyeball image data has been input to the visual axis calculation processing device 9, the index mark outside the finder field is turned off (#237).

In the visual axis calculation processing device, whether the eyeball image data is effective is being determined (#238). When it is determined in the visual axis calculation processing device 9 that the reflected light source image by the cornea or the image of the iris cannot be detected from said eyeball image data, the index mark is again turned on (#234) and starts to re-take eyeball image data. Since at this time, the index mark once turned off by the photographer is again turned on, it can be recognized that the input of the last eyeball image data was incomplete.

On the other hand, it is detected that the eyeball image data is effective and the particular points of the reflected light source image and the image of the iris are detected from said eyeball image data (#238), and in the visual axis calculation processing device 9 serving also as optical constant calculating means, the corneal radius r of the eyeball of the photographer and the distance Xt from the reference position of the visual axis detecting optical system to the cornea 21 of the eyeball of the photographer are calculated on the basis of the aforementioned expressions (12) and (13) (#239).

Also, the anterior chamber depth t and the correction angle δ of the optical axis and visual axis of the eyeball are calculated from the particular points of the reflected light source image and the image of the iris (#230). The method of calculating the anterior chamber depth t and the correction angle δ of the optical axis and visual axis of the eyeball is as follows.

When the photographer gazes at the index mark 91 in the finder system of the camera shown in FIG. 9B (the coordinates (Z, Y) on the focusing screen 104), the relations between the eyegaze point and the particular points of the eyeball are substantially similar to the aforementioned expression (14) and are expressed as:

$$(r-t)^*\sin(Z/m-\delta) \approx Zc'/\beta 2(Xt, t) - (Zg' + \Delta z(Xt,r))/\beta 1(Xt, r) \ldots \quad (17)$$

$$(r-t)^*\sin(Y/m) \approx Yc/\beta 2(Xt, t) - (Yg' + \Delta y(Xt, r))/\beta 1(Xt, r) \ldots \quad (18)$$

where (Zc', Yc') are the coordinates of the center of the pupil of the eyeball of the photographer on the surface of the image sensor 16, and (Zg', Yg') are the central coordinates of the two reflected images of the cornea on the surface of the image sensor 16. Also, the component of the angle of rotation of the photographer's visual axis in the vertical direction coincides with the component of the angle of rotation of the optical axis of the eyeball in the vertical direction and therefore, the term δ of the angle correction is not included in expression (18).

The anterior chamber depth t is calculated from expression (18), and the value of the anterior chamber depth t is substituted for expression (17) to thereby calculate the correction angle δ of the optical axis and visual axis of the eyeball. Further, the calculated optical constants of the eyeball are memorized in the visual axis calculation processing device (#241). If the design of the device is such that at this time, the data of the photographer the optical constants of whose eyeball have been detected is also memorized in the visual axis calculation processing device 9, if the detection of the optical constants of the eyeball is once effected for the camera used, no more detection need be effected.

The index mark in the finder system is made to flicker for a predetermined time to inform the photographer that the optical constants of the eyeball have been memorized in the visual axis calculation processing device 9 and the detection of the optical constants of the eyeball has been terminated (#242), whereafter the eyeball optical constant detection mode is released (#243). At the same time, the third infrared light emitting diode 5c is turned off (#244) and further, a shift is made to the visual axis input mode (#245). In the visual axis input mode, the visual axis of the photographer is accurately detected by the use of the previously calculated optical constants of the eyeball, and information intended by the photographer, for example, the position of an object the photographer wants to photographing by focusing, is input to the camera on the basis of the visual axis of the photographer.

In the present embodiment, a camera has been shown as an example of the optical apparatus, but the present invention is equally applicable to an optical apparatus such as a microscope.

What is claimed is:

1. An optical apparatus comprising:
   a viewer for viewing an object
   light receiving means for receiving a reflected light beam from an eyeball of an observer looking into said viewer;
   display means for displaying a plurality of index marks at a plurality of positions, wherein one of said plurality of index marks is selectively conspicuously displayed; and
   means for obtaining at least one optical constant of the anterior part of the eyeball from an electrical signal of said light receiving means, for effecting correction of the calculation of the direction of the visual axis of the eyeball by the use of the optical constant, and for producing a signal indicative of the direction of the visual axis,
   wherein the electrical signal of said light receiving means is produced when the observer looks at the index mark conspicuously displayed by said display means.

2. An optical apparatus according to claim 1, wherein the optical constant is indicative of the anterior chamber depth of the eyeball of the observer.

3. An optical apparatus according to claim 1, wherein the optical constant is indicative of the radius of curvature of a cornea of the eyeball of the observer.

4. An optical apparatus according to claim 1, further comprising illuminating means for illuminating the eyeball with light from a plurality of light sources.

5. An optical apparatus according to claim 4, wherein said light sources are light emitting diodes.

6. An optical apparatus according to claim 4, wherein the spacing between a first light source and a second light source of said plurality of light sources and the spacing between the second light source and a third light source of said plurality of light sources differ from each other, and the direction of arrangement of said first and second light sources and the direction of arrangement of said second and third light sources are orthogonal to each other.

7. A camera comprising:
   a viewer for viewing an object;
   light receiving means for receiving a reflected light beam from an eyeball of an observer looking into said viewer;
   display means for displaying a plurality of index marks at a plurality of positions, wherein one of said plurality of index marks is selectively conspicuously displayed;

illuminating means comprising a plurality of light sources at different positions for illuminating said eyeball with light;

calculation means for obtaining at least one optical constant of the eyeball from an electrical signal of said light receiving means, for effecting correction of the calculation of the direction of the visual axis of the eyeball by the use of the optical constant, and for producing a signal indicative of the direction of the visual axis; and means for producing a signal indicative of the photographing conditions of said camera in accordance with the output of said calculation means, wherein an electrical signal of said light receiving means is produced when the observer looks at the index mark conspicuously displayed by said display means.

8. A camera according to claim 7, wherein the spacing between a first light source and a second light source of said plurality of light sources and the spacing between the second light source and a third light source of said plurality of light sources differ from each other, and the direction of arrangement of said first and second light sources and the direction of arrangement of said second and third light sources are orthogonal to each other.

9. A camera according to claim 7, wherein the optical constant is indicative of the anterior chamber depth and the radius of curvature of a cornea of the eyeball.

10. An optical apparatus comprising:
a viewer for viewing an object;
light receiving means for receiving a reflected light beam from an eyeball of an observer looking into said viewer; and
means for calculating a direction of a visual axis of the eyeball from an electrical signal of said light receiving means and for determining whether the eye of the observer looking into said viewer is the right eye or the left eye in accordance with the calculated direction.

11. An optical apparatus according to claim 10, further comprising index mark indicating means for selecting one of a plurality of index marks on the basis of a signal indicative of the result of the determination and displaying the selected index mark to the observer.

12. An optical apparatus according to claim 10, further comprising illuminating means for projecting illuminating light onto the eyeball so as to be reflected by and transmitted through areas substantially symmetrical with respect to the optical axis of the cornea of the eyeball.

13. An optical apparatus according to claim 10, wherein said light receiving means receives two reflected light source images of a cornea and of portions of an iris.

14. An optical apparatus according to claim 13, wherein said light receiving means has an imaging optical element and a two-dimensional photosensor array.

15. An optical apparatus according to claim 10, wherein said optical apparatus comprises a single-lens reflex camera.

16. An optical apparatus according to claim 15, further comprising:
an objective lens; and
focus detecting means for detecting the focus adjusted states of said objective lens with respect to a plurality of locations in a scene focused by said objective lens.

17. An optical apparatus comprising:
first means for receiving light from an eye and for forming a signal corresponding to an intensity distribution of the light from said eye; and
second means for detecting a visual axis of the eye based on the signal formed by said first means, wherein said second means comprises means for obtaining information related both to an anterior chamber depth of the eye and a radius of curvature of a cornea of the eye, from the signal formed by said first means, wherein the visual axis is detected by using the information.

18. An apparatus according to claim 17, further comprising means for illuminating the eye with light beams from a pair of light sources.

19. An apparatus according to claim 17, wherein the information comprises first information related to the anterior chamber depth and second information related to the radius of curvature of the cornea.

* * * * *

UNITED STATES PATENT AND TRADEMARK OFFICE
CERTIFICATE OF CORRECTION

PATENT NO. : 5,386,258
DATED : January 31, 1995
INVENTOR(S) : AKIHIKO NAGANO

It is certified that error appears in the above-indentified patent and that said Letters Patent is hereby corrected as shown below:

ON THE COVER PAGE

[56] References Cited

FOREIGN PATENT DOCUMENTS

"64-241511 9/1989 Japan" should read
--1-241511 9/1989 Japan--.
"1274736 11/1989 Japan" should read
--1-274736 11/1989 Japan--.

COLUMN 1

Line 54, "image)," should read --image) d,--.

COLUMN 2

Line 67, "is-applied" should read --is applied--.

COLUMN 5

Line 50, "an individual" should read --the individual--.

COLUMN 6

Line 35, "the-optical" should read --the optical--.

COLUMN 8

Line 54, "d" should read --d,--.

UNITED STATES PATENT AND TRADEMARK OFFICE
CERTIFICATE OF CORRECTION

PATENT NO. : 5,386,258

DATED : January 31, 1995

INVENTOR(S) : AKIHIKO NAGANO

It is certified that error appears in the above-indentified patent and that said Letters Patent is hereby corrected as shown below:

COLUMN 9

Line 66, "$(r-t)*\sin\theta\Delta((Za'+Zb')/2)\beta2(Xt,t) - \{(Zd'- + Ze')/2 + \Delta Z)\}/\beta1(Xt, r)$  (8)"
should read --$(r - t)*\sin\theta \approx ((Za'+Zb')/2)/\beta2(Xt,t) - \{(Zd'+Ze')/2+\Delta Z(Xt,r)\} /\beta1(Xt,r)$. .....(8)--.

COLUMN 10

Lines 3 and 4, "$\theta \approx \arcsin\{(Zc'/\beta2(Xt, t)-(Zg'+\Delta Z(Xt, r))/\mu1(Xt, r))/(r-t)\}$,  (9)"
should read --$\theta \approx \arcsin\{(Zc'/\beta2(Xt, t) - (Zg' + \Delta Z(Xt, r))/\beta1(Xt, r))/(r - t)\}$, ... (9)--.

Line 65, "AZ" should read --$\Delta Z$--.

COLUMN 11

Line 45, "$(r-t)*(Z1/m-6) \approx Zc1'/\beta2(Xt1, t)-(Zg1'+\Delta z(Xt1, r))/\beta1(Xt1, r)...$  (15)"
should read --$(r-t)*(Z1/m-\delta) \approx Zc1'/\beta2(Xt1, t)-(Zg1' + \Delta z(Xt1, r))/\beta1(Xt1, r)$..... (15)--.

COLUMN 12

Line 13, "Shown" should read --shown--.

COLUMN 14

Line 6, "shift" should read --a shift--.

UNITED STATES PATENT AND TRADEMARK OFFICE
CERTIFICATE OF CORRECTION

PATENT NO. : 5,386,258

DATED : January 31, 1995

INVENTOR(S) : AKIHIKO NAGANO

It is certified that error appears in the above-indentified patent and that said Letters Patent is hereby corrected as shown below:

COLUMN 15

Line 41, "(r-t)*sin(Y/m)≈Yc/β2(Xt, t)-(Yg'+Δy(Xt, r))/β1(Xt, r)...                                (18)"
should read --(r-t)*sin(Y/m) ≈ Yc'/β2(Xt, t) -(Yg'+Δy(Xt, r))/β1(Xt, r)     .....(18)--.

COLUMN 16

Line 13, "photographing" should read --photograph--.
Line 22, "object" should read --object;--.

Signed and Sealed this

Ninth Day of May, 1995

*Attest:*

BRUCE LEHMAN

*Attesting Officer*     *Commissioner of Patents and Trademarks*